(12) United States Patent
Willinger

(10) Patent No.: US 8,127,720 B2
(45) Date of Patent: Mar. 6, 2012

(54) CHEW TOYS COMPRISING BIOLOGICALLY DEGRADABLE MATERIAL

(75) Inventor: Jonathan Willinger, Tenafly, NJ (US)

(73) Assignee: J.W. Pet Company, Inc., Teterboro, NJ (US)

( * ) Notice: Subject to any disclaimer, the term of this patent is extended or adjusted under 35 U.S.C. 154(b) by 0 days.

(21) Appl. No.: 12/959,859

(22) Filed: Dec. 3, 2010

(65) Prior Publication Data
US 2011/0126776 A1  Jun. 2, 2011

Related U.S. Application Data

(62) Division of application No. 11/724,609, filed on Mar. 15, 2007, now Pat. No. 7,909,003.

(60) Provisional application No. 60/881,644, filed on Jan. 22, 2007, provisional application No. 60/836,049, filed on Aug. 7, 2006.

(51) Int. Cl.
*A01K 29/00* (2006.01)
*A23P 1/10* (2006.01)

(52) U.S. Cl. .......................... 119/709; 426/512; 119/711

(58) Field of Classification Search .................. 119/709, 119/710, 711; 426/635, 512, 514
See application file for complete search history.

(56) References Cited

U.S. PATENT DOCUMENTS
5,280,055 A   1/1994 Tomka
(Continued)

OTHER PUBLICATIONS

U.S. Office Action dated Jan. 5, 2010 from corresponding U.S. Appl. No. 11/724,609.

(Continued)

*Primary Examiner* — Yvonne R. Abbott
(74) *Attorney, Agent, or Firm* — Katten Muchin Rosenman LLP

(57) ABSTRACT

A chew toy includes a first body comprises a biodegradeable material, the first body includes an interior space and a passage to the interior space and a second body that is disposed at least partially in the interior space and extends through the passage to an exterior of the first body. The second body includes a food item. A method of making a chew toy includes inserting a food item into a mold and molding a biodegradable material as a body around the food item. The body includes an interior space and a passage to the interior space.

22 Claims, 7 Drawing Sheets

U.S. PATENT DOCUMENTS

| | | | |
|---|---|---|---|
| 5,314,934 A | 5/1994 | Tomka | |
| 5,419,283 A | 5/1995 | Leo | |
| 5,476,069 A | 12/1995 | Axelrod | |
| 5,508,322 A | 4/1996 | Bortnick et al. | |
| 5,656,682 A | 8/1997 | Rimsa et al. | |
| 5,662,731 A | 9/1997 | Andersen et al. | |
| 5,679,145 A | 10/1997 | Andersen et al. | |
| 5,705,203 A | 1/1998 | Andersen et al. | |
| 5,709,827 A | 1/1998 | Andersen et al. | |
| 5,716,675 A | 2/1998 | Andersen et al. | |
| 5,736,209 A | 4/1998 | Andersen et al. | |
| 5,756,194 A | 5/1998 | Shogren et al. | |
| 5,776,388 A | 7/1998 | Andersen et al. | |
| 5,810,961 A | 9/1998 | Andersen et al. | |
| 5,827,565 A | 10/1998 | Axelrod | |
| 5,843,544 A | 12/1998 | Andersen et al. | |
| 5,861,461 A | 1/1999 | Lee et al. | |
| 5,976,235 A | 11/1999 | Andersen et al. | |
| 6,030,673 A | 2/2000 | Andersen et al. | |
| 6,083,586 A | 7/2000 | Andersen et al. | |
| 6,090,195 A | 7/2000 | Andersen et al. | |
| 6,096,809 A | 8/2000 | Lorcks et al. | |
| 6,159,516 A | 12/2000 | Axelrod et al. | |
| 6,168,857 B1 | 1/2001 | Andersen et al. | |
| 6,176,915 B1 | 1/2001 | Franke et al. | |
| 6,200,404 B1 | 3/2001 | Andersen et al. | |
| 6,202,598 B1 | 3/2001 | Willinger | |
| 6,214,907 B1 | 4/2001 | Tomka | |
| 6,221,928 B1 | 4/2001 | Kozma et al. | |
| 6,231,970 B1 | 5/2001 | Andersen et al. | |
| 6,235,816 B1 | 5/2001 | Lorcks et al. | |
| 6,242,503 B1 | 6/2001 | Kozma et al. | |
| 6,262,137 B1 | 7/2001 | Kozma et al. | |
| 6,379,725 B1 | 4/2002 | Wang et al. | |
| 6,455,083 B1 | 9/2002 | Wang | |
| 6,472,497 B2 | 10/2002 | Loercks et al. | |
| 6,506,824 B1 | 1/2003 | Bastioli et al. | |
| 6,515,054 B1 | 2/2003 | Matsushita et al. | |
| 6,573,340 B1 | 6/2003 | Khemani et al. | |
| 6,584,938 B2 * | 7/2003 | Sherrill et al. | 119/710 |
| 6,586,027 B2 | 7/2003 | Axelrod et al. | |
| 6,709,526 B1 | 3/2004 | Bailey et al. | |
| 6,723,160 B2 | 4/2004 | Mackey et al. | |
| 6,802,895 B2 | 10/2004 | Mackey et al. | |
| 6,805,823 B2 | 10/2004 | Franke et al. | |
| 6,811,740 B2 | 11/2004 | James et al. | |
| 6,837,037 B2 | 1/2005 | Willinger | |
| 6,916,497 B2 | 7/2005 | Axelrod et al. | |
| 6,955,850 B1 | 10/2005 | Cabell et al. | |
| 6,977,116 B2 | 12/2005 | Cabell et al. | |
| 6,990,927 B2 | 1/2006 | Axelrod | |
| 7,025,821 B2 | 4/2006 | Mackey et al. | |
| 7,029,620 B2 | 4/2006 | Gordon et al. | |
| 7,041,369 B1 | 5/2006 | Mackey et al. | |
| 7,082,894 B2 | 8/2006 | Sherrill et al. | |
| RE39,339 E | 10/2006 | Andersen et al. | |
| 7,135,063 B2 | 11/2006 | Franke et al. | |
| 7,332,188 B2 | 2/2008 | Axelrod | |
| 7,490,579 B2 | 2/2009 | Axelrod | |
| 7,579,038 B1 | 8/2009 | Weinberg | |
| 7,677,203 B2 * | 3/2010 | Stern | 119/709 |
| 7,691,426 B2 | 4/2010 | Axelrod et al. | |
| 7,694,653 B2 | 4/2010 | Axelrod | |
| 2002/0119224 A1 | 8/2002 | Axelrod et al. | |
| 2002/0185085 A1 * | 12/2002 | Sherrill et al. | 119/710 |
| 2004/0025803 A1 * | 2/2004 | Sherrill et al. | 119/710 |
| 2004/0043131 A1 | 3/2004 | Fumita | |
| 2004/0126462 A1 | 7/2004 | Tepper et al. | |
| 2005/0074541 A1 | 4/2005 | Tsengas | |
| 2005/0145193 A1 * | 7/2005 | Kirch | 119/710 |
| 2005/0217603 A1 * | 10/2005 | Hingst | 119/710 |
| 2006/0000424 A1 | 1/2006 | Axelrod | |
| 2006/0225666 A1 | 10/2006 | Axelrod | |
| 2006/0243219 A1 * | 11/2006 | Brown | 119/710 |
| 2007/0264415 A1 | 11/2007 | Axelrod et al. | |
| 2009/0151649 A1 | 6/2009 | Vardy et al. | |

OTHER PUBLICATIONS

U.S. Office Action dated Jun. 22, 2010 from corresponding U.S. Appl. No. 11/724,609 with Notice of References.

* cited by examiner

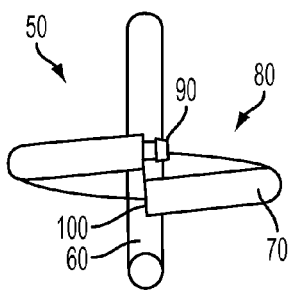
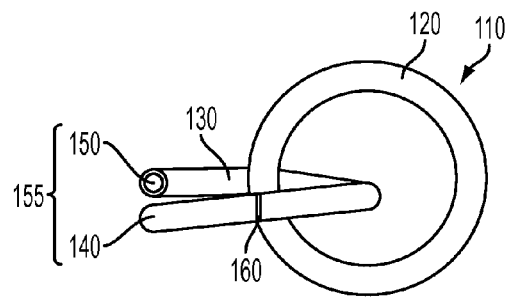
FIG. 1
FIG. 2
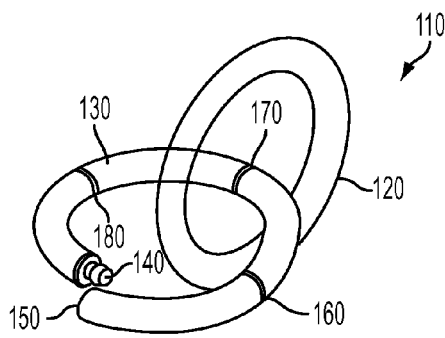
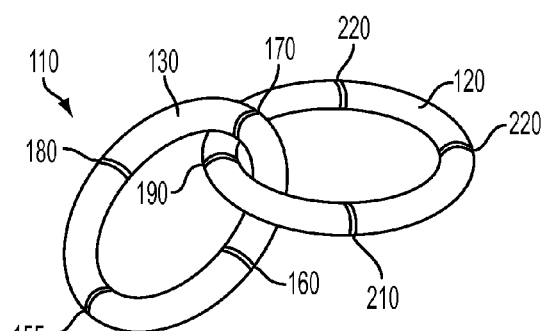
FIG. 3
FIG. 4
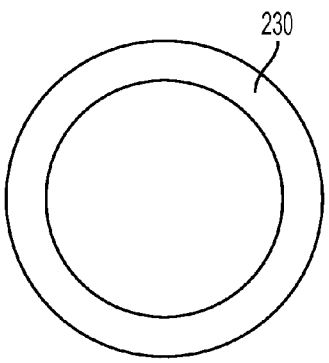
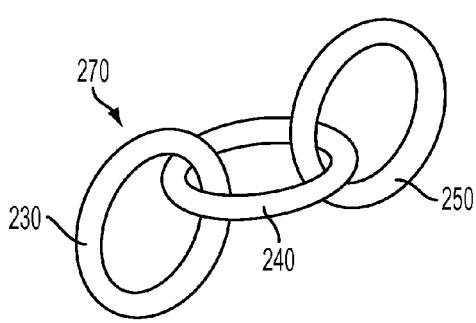
FIG. 5
FIG. 6

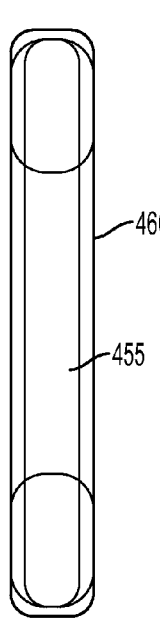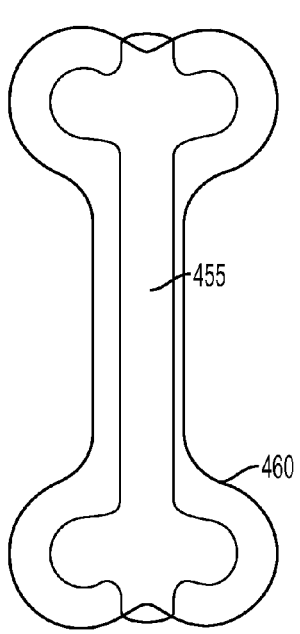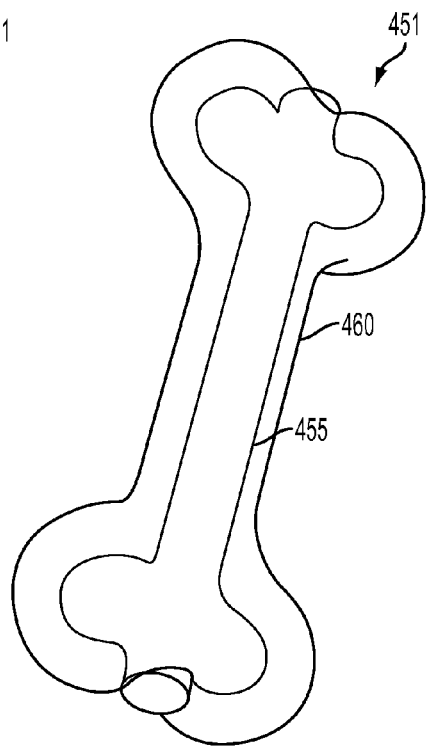
FIG. 26A  FIG. 26B  FIG. 26C
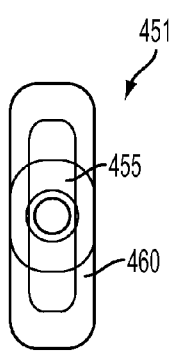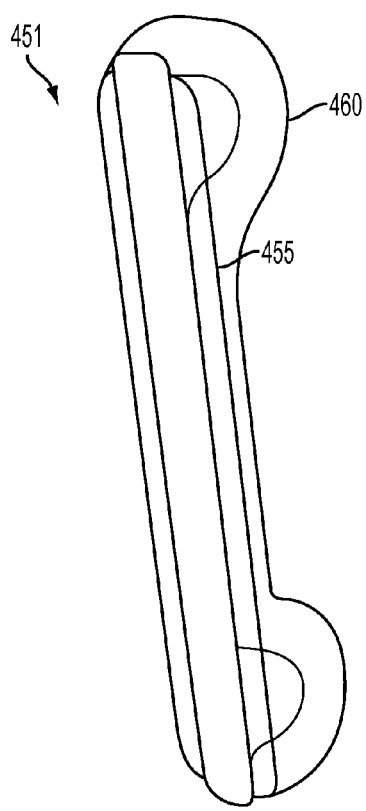
FIG. 26D  FIG. 26E

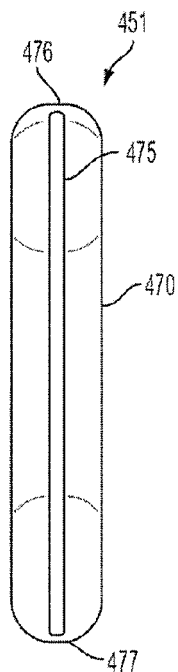
FIG. 27A
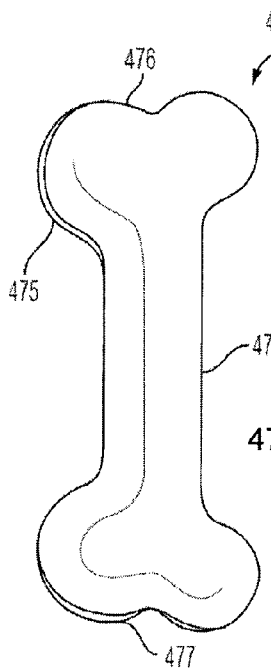
FIG. 27B
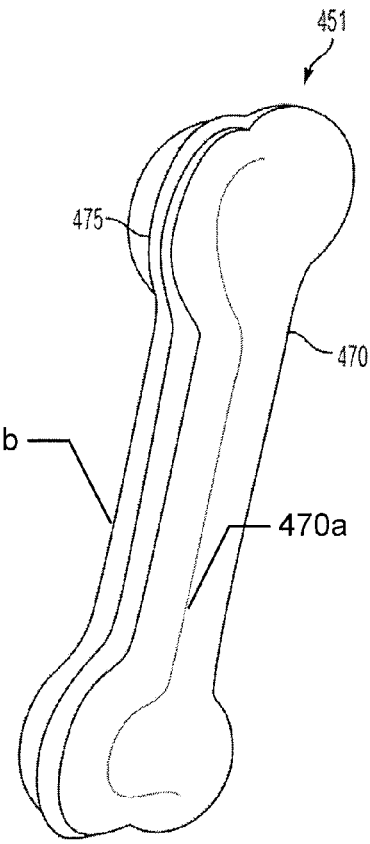
FIG. 27C
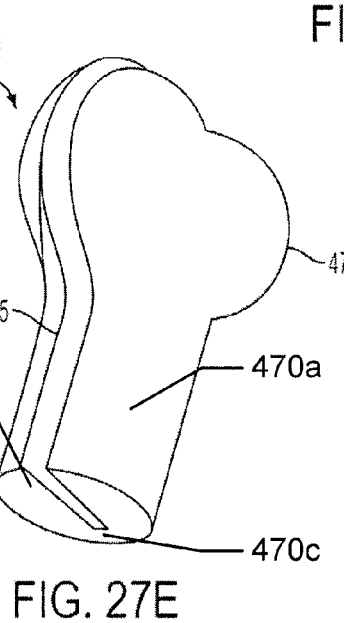
FIG. 27D
FIG. 27E

CHEW TOYS COMPRISING BIOLOGICALLY DEGRADABLE MATERIAL

CROSS REFERENCE TO RELATED APPLICATIONS

This application is a divisional application of and claims priority to U.S. Ser. No. 11/724,609, filed on Mar. 15, 2007, which is pending and which is hereby incorporated in its entirety for all purposes.

U.S. Ser. No. 11/724,609 claims priority to U.S. Ser. No. 60/881,644 filed Jan. 22, 2007, which is hereby incorporated by reference for all purposes.

U.S. Ser. No. 11/724,609 claims priority to U.S. Ser. No. 60/836,049 filed Aug. 7, 2006, which is hereby incorporated by reference for all purposes.

This application incorporates by reference all patents and applications for patents described, listed, identified, discussed in this application, including the following applications which are incorporated by reference: U.S. Pat. No. 6,202,598 issued Mar. 20, 2001, U.S. Ser. No. 60/441,694 filed Jan. 22, 2003, and U.S. Pat. No. 6,837,037 issued Jan. 4, 2005.

FIELD OF THE INVENTION

The present invention relates to biologically degradable ("biodegradable") toys for pets in general and more particularly to chew toys which are in ring shape including interconnected ring chain toys comprising biologically degradable material and to chew toys that comprise overmolded portions of biologically degradable material.

BACKGROUND OF THE INVENTION

In U.S. Pat. Nos. 6,202,598 "Chewable Molded Pet Toy" and 6,837,037 "Interconnected Rubber Ring Chain," which are hereby incorporated in their entirety by reference for all purposes, the inventor of the present application disclosed toys and methods of forming such toys.

Such toys are typically made of rubber. However, a need exists for toys to be made by other material.

SUMMARY OF THE INVENTION

An interconnected ring chain comprises a first ring comprising a biologically degradable material and having a first shape and a second ring comprising a biologically degradable material and having a second shape and interconnected with the first ring such that the first and second rings are both movable and substantially inseparable relative to each other. Each ring may be solid (continuous) or non-solid (discontinuous) such that the rings may be interconnected by mechanical or non-mechanical methods. A chain may be formed from rings having the same or various shapes.

One embodiment of the invention relates to a biodegradable chew toy having a biologically degradable material that is overmolded by a second plastic material that is made of the same material as the first plastic material which has a different color(s) and/or flavor(s) than that of the first plastic material. The material used for the first and second plastic materials is biodegradable.

In another embodiment of the invention a biodegradable chew toy is formed by having a food material such as jerky inserted into or placed in a mold and then the biologically degradable material is molded around it.

BRIEF DESCRIPTION OF THE DRAWINGS

FIG. 1 illustrates pair of rings used to form a chain in accordance with the teachings of the present invention.

FIG. 2 illustrates an alternative embodiment of a pair of rings used to form a chain of the invention.

FIG. 3 illustrates a series of grooves provided on one of the rings shown in FIG. 2.

FIG. 4 illustrates the use of grooves on both rings shown in FIG. 2.

FIG. 5 illustrates a ring used to form a chain in accordance with an alternative embodiment of the present invention.

FIG. 6 illustrates a chain formed from a plurality of rings in accordance with the invention.

FIGS. 26A-E illustrates a further embodiment of the present invention wherein a biodegradable chew toy has a first body formed of a biodegradable material that is over molded with the same material by a second body but where the first body has different colors and/or flavors from the second body; and FIGS. 27A-E illustrates an example of a yet further embodiment of the present invention wherein a biodegradable chew toy is formed by having a food material such as jerky inserted into a mold and then the biodegradable plastic material is molded around it.

DETAILED DESCRIPTION OF THE PREFERRED EMBODIMENTS

Figure 7:
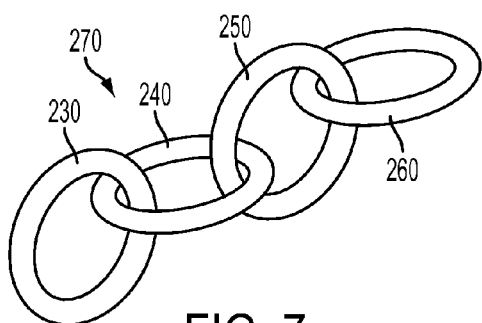
FIG. 7 illustrates an alternative embodiment of a chain of the invention.
Figure 8:
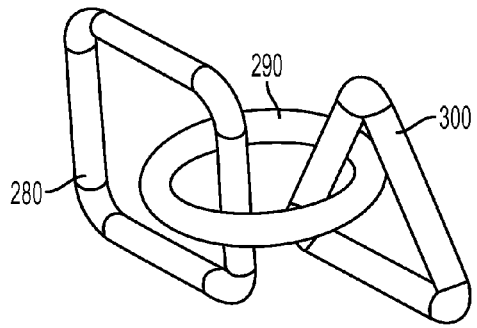
FIG. 8 illustrates an alternative embodiment of a chain of the invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

FIGS. 1-8 illustrate a first type of edible chew toy comprising a chain as taught further herein and FIGS. 9-28 illustrate further types of chew toys. Each toy is preferably formed from one or more biologically degradable materials 10. Preferably, each toy comprises at least one material that is thermoplastic or has thermoplastic tendencies.

Such a thermoplastic material 10 may have different qualities such as elasticity or brittleness. Therein, a biologically degradable material 10a is operatively elastic, while a biologically degradable material 10b is operatively inelastic. Such a biologically degradable material may be any known or yet developed biologically degradable material and that preferably has thermoplastic properties and/or are injection moldable.

FIG. 1 illustrates a first embodiment of a chain 50 of the invention having a first solid or continuous ring 60 interconnected with a second non-solid, segmented or discontinuous ring 70. The second ring 70 is provided with a joint 80 having a first "male" part 90 and a second "female" part 100 that are joined together to secure the second ring 70 to the first ring 60, such that the rings 60, 70 are movable relative to each other yet substantially inseparable from each other. Each ring 60, 70 has a round or circular shape, although other shapes are contemplated. For purposes of explanation, the term "ring" as used herein will be understood to mean a continuous-loop object, it being understood that the term "ring" shall not be limited to an annular, toroidal shape. Also, while certain rings may be illustrated herein with round cross-sections, such cross-section can be any shape, and may have a thickness that is solid or hollow, tubular. Such rings may be any size.

In FIG. 1, the second ring 70 is looped through the first ring 60 and then the joint part 90 is inserted into the joint part 100 to attach or otherwise secure the second ring 70 relative to the first ring 60. Although not necessary, a biologically degradable adhesive (not shown) may be used to secure the joint 80. If an adhesive is used, the opening 100 would preferably be notched to better support a glue joint. A notch can be created so that the second ring 70 will not come apart even under tremendous pull tension and even if an adhesive is not used. The adhesive, if used, is preferably applied all around the notch in order to maximize the adhesion area. The glued joint 80 creates the appearance of a groove (see FIGS. 2 and 4 discussed below) in the second ring 70.

The resultant chain 50 formed by the plurality of rings 60, 70 could be used for tug-of-war and other amusements with one's pet. Of course, any number of rings may be looped together to form a chain as long as such number is preferably greater than one.

FIGS. 2-4 illustrate an alternative embodiment of a chain 110 of the invention having a first solid or continuous ring 120 and a second non-solid or discontinuous ring 130 looped therethrough. The second ring 130 has first joint part 140 and a second joint part 150 that are joined together to form a joint 155 (FIG. 4) in the same manner as illustrated in FIG. 1. Because the joinder of the joint parts 140, 150 creates a joint 155 (FIG. 4) having a grooved appearance, one groove 160 (FIG. 2) or multiple grooves 160, 170, 180 (FIG. 3) are preferably fashioned into the outer periphery of the second ring 130 to camouflage the grooved appearance created by the joint 155. Similarly, a series of indentations or grooves 190, 200, 210, 220 can be created in the first ring 120 (FIG. 4) so that the solid and non-solid rings 120, 130 look the same. Such grooves may be spaced around the outer periphery of the rings in a random, uniform and/or equidistant pattern. Again, the rings may be completely round as shown in FIGS. 1-3, or may be formed from other shapes as shown later in connection with FIG. 8.

FIGS. 5-8 illustrate a further embodiment of the present invention, wherein a series of two or more objects or rings comprising material 10a or 10b are interconnected without utilizing glue or other mechanical bonding. Such embodiment may create a chain 270 of rings.

First, one ring 230 is molded (FIG. 5) using means known in the art. Then, the molded ring 230 is placed in a second mold where another ring 240 is then molded so that the second ring 240 runs through the center of the first ring 230 (FIG. 6). This process can then be repeated to create a chain 270 formed from a plurality of looped rings 230, 240, 250, 260 (FIGS. 6 and 7). In this way a substantially unbreakable, non-tearing chain 270 of biodegradable material rings is created. Other shaped rings 280, 290, 300 (FIG. 8) that are both round and polygonal could also be used and created through such interlocking method, all without utilizing adhesive or other mechanical means of locking. In this manner a more versatile dog toy is created, one that can be used a tug or a chew toy by a pet.

Figure 9:
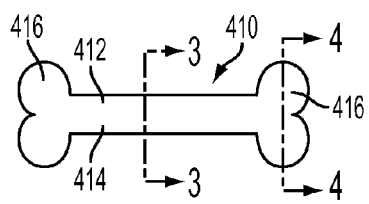
FIG. 9 is a front elevation view of a core formed in accordance with a first embodiment of the invention.
Figure 10:
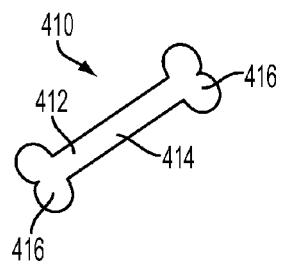
FIG. 10 is a perspective view of the core of FIG. 8.

The present invention will now be described in conjunction with the drawings, beginning with FIGS. 9 and 10 which show a core or body 410 of a chewable pet toy. Core 410 is shown in the shape of a dog bone 412 for the purpose of illustration, however, virtually any shape of core or body may be used. Dog bone core 412 is formed with a central elongated shaft 414 having a pair of bulbous enlarged knobs or condyles 16 formed on opposite ends of the shaft 414.

Figure 11:
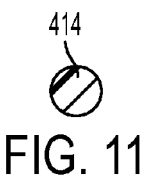
FIG. 11 is a view in section taken through line 3-3 of FIG. 9.
Figure 12:
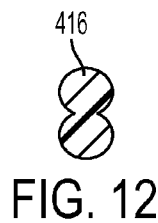
FIG. 12 is a view in section taken through line 4-4 of FIG. 9.

As seen in FIG. 11, the shaft 414 of core 410 may have a circular cross section. Of course, other cross-sections such as oval and rectangular may be used. The knobs or condyles 416 may have a figure eight or hourglass cross section as shown in FIG. 12. Again, other condyles 416 may be formed with other cross sections such as round (in the case of spherical condyles) oval or even rectangular sections.

Core 410 is preferably formed of a relatively harder material such as biologically degradable material 10b. Conventional plastic molding techniques can be used, such as injection molding, to form core 410. In order to produce a desirable chew toy in accordance with the invention, a softer layer or coating 418 comprising biologically degradable material 10a is provided over at least a portion of core 410 as shown in FIGS. 13, 14, and 15.

Coating layer 418 may be formed by overmolding a chewable soft material cover layer over the harder and stiffer core 410. Again, injection molding may be used to form layer 18, although other techniques such as a dipping, painting or spraying could also be used. A thermoplastic elastomer may be used to form layer 418.

Figure 13:
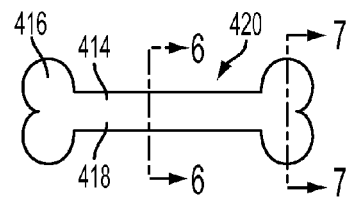
FIG. 13 is a front elevation view of the core of FIG. 9 overmolded with a soft layer of biodegradable material.
Figure 14:
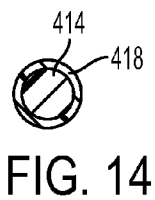
FIG. 14 is a view in section taken through line 6-6 of FIG. 13.
Figure 15:
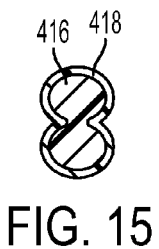
FIG. 15 is a view in section taken through line 7-7 of FIG. 13.
Figure 16:
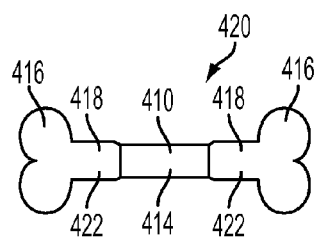
FIG. 16 is a front elevation view of a second embodiment of the invention wherein the core of FIG. 9 is overmolded or coated only on its end portions.

In FIGS. 13, 14 and 15, the entire core 410 is completely encapsulated and overmolded with coating layer 418 to form a chewable pet toy 420. However, as shown in FIG. 16, only a portion or selected portions of the core 410 may be covered by coating layer 418 to form toy 420. In the example of FIG. 16, condyles 416 and a portion 422 of the adjoining ends of shaft 14 are overmolded or otherwise covered with coating layer 418. This example produces sections similar to those shown in FIGS. 11 and 15.

Alternatively, the shaft 414 can be coated or overmolded with a coating layer 418 and the knobs or condyles 416 on core 410 may remain exposed and uncoated so as to produce sections such as those shown in FIGS. 12 and 14. In the example of FIG. 16, the coating layer 418 can be preformed as a sleeve or sock of soft biologically degradable material 10a and stretched over each condyle 416 in the manner of a resilient sock. Alternatively, an open ended tubular cylindrical sleeve could be stretched over one of the condyles 416 and pulled onto shaft 414 to cover only the shaft 414 so as to leave the condyles 416 of core 410 exposed.

Figure 17:
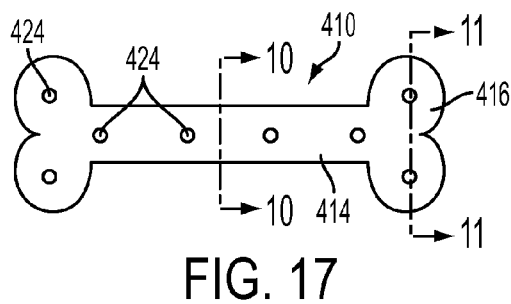
FIG. 17 is a front elevation view of a core formed in accordance with a third embodiment of the invention.
Figure 18:
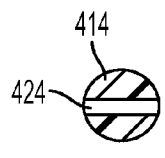
FIG. 18 is a view in section taken through line 10-10 of FIG. 17.
Figure 19:
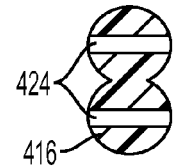
FIG. 19 is a view in section taken through line 11-11 of FIG. 17.

In order to provide increased retention of cover layer 418 on core 410, one or more through bores or passages 424 are formed through core 410 to provide anchorage to layer 418 as seen in FIGS. 17, 18 and 19. Bores 424 may be formed completely through the shaft 14 as shown in FIG. 19.

Figure 20:
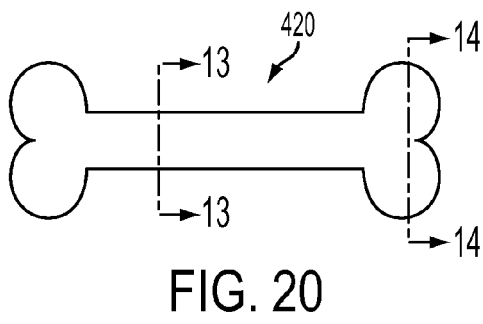
FIG. 20 is a front elevation view of the core of FIG. 17 overmolded with a softer layer of biodegradable material.
Figure 21:
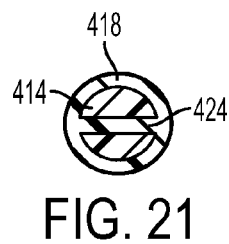
FIG. 21 is a view in section taken through line 13-13 of FIG. 20.
Figure 22:
FIG. 22 is a view in section taken through line 14-14 of FIG. 20.

When the core 410 of FIG. 17 is overmolded or otherwise encapsulated in a softer cover layer 418 as shown in FIGS. 20, 21 and 22, the cover layer 418 flows into and through the bores 424 so as to interconnect the opposite sides of layer 418 to the interior of core 410. This locks the layer 418 on the surface of core 410 in a secure fashion and resists removal of the layer 418 from the core 410 by chewing, abrading or other mechanical forces applied by a pet.

Figure 23:
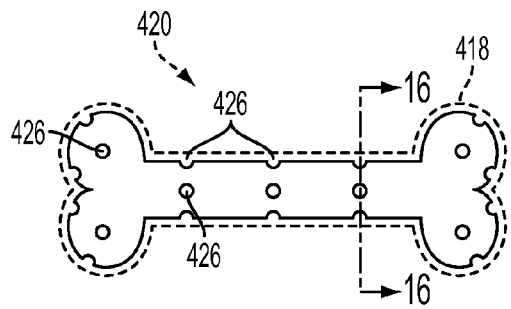
FIG. 23 is a front elevation view of a core formed in accordance with a fourth embodiment of the invention.
Figure 24:
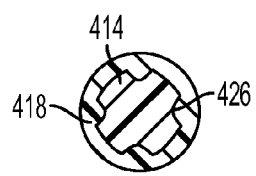
FIG. 24 is a view in section taken through line 16-16 a FIG. 23, after the core has been overmolded with a softer cover layer.

Rather than form through bores 424 completely through core 410, it is also possible to provide enhanced retention of layer 418 on core 410 by forming dimples, recesses or pockets on the surface of core 410. As seen in FIGS. 23 and 24, a series of small recesses 426 is formed in the surface of core 410 to serve as retention or anchor points for layer 418, which is shown in dashed lines in FIG. 23. Once layer 418 is applied to core 410, the softer material of layer 418 enters and fills each of the recesses 426 and thereby locks layer 418 to core 410 as shown in FIG. 24.

Referring now to the drawings, FIGS. 25A-D and FIGS. 26A-E illustrate an embodiment of the invention in which a biodegradable chew toy 451 is made by over molding techniques known in the art such as provided above or as suggested, but not limited to, U.S. Pat. No. 6,202,598 which is incorporated herein by reference thereto.

The chew toy 451 is formed by taking a first molded biodegradable plastic material 455 comprising biologically degradable material 10a or 10b and over molding it with a second biodegradable plastic material 460 comprising biologically degradable material 10a or 10b. The second plastic material 460 is made of the same plastic material as the first plastic material 455 but has dissimilar color(s) and/or flavor(s).

The biodegradable plastic material for materials 5 and 10 can be made from a starch such as corn starch and contain a binder such as EVA (Booda Velvets) or Casein (TFH Edibles).

Aesthetically different shapes and colors can be produced to provide various shaped and colored chew toys FIGS. 25A-D illustrate one possible pet chew toy having an outer or second plastic material 460 that is circularly shaped.

Figure 25A:
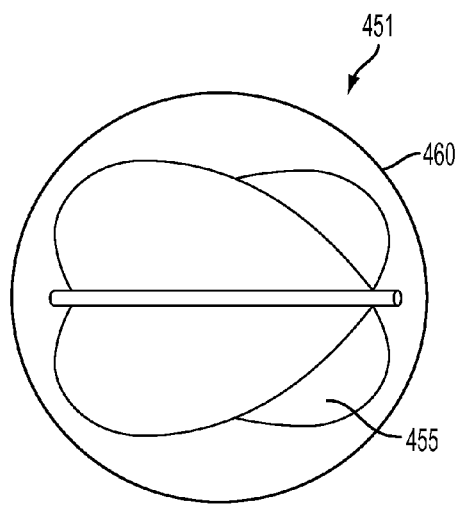
FIGS. 25A-D illustrates an example of a further embodiment of the present invention wherein a biodegradable chew toy has a first body formed of a biodegradable material that is over molded with the same material by a second body but where the first body has different colors and/or flavors from the second body.
Figure 25C:
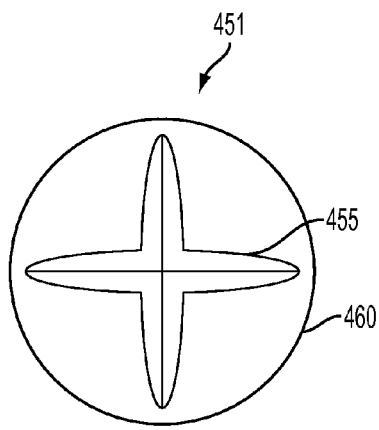
Figure 25B:
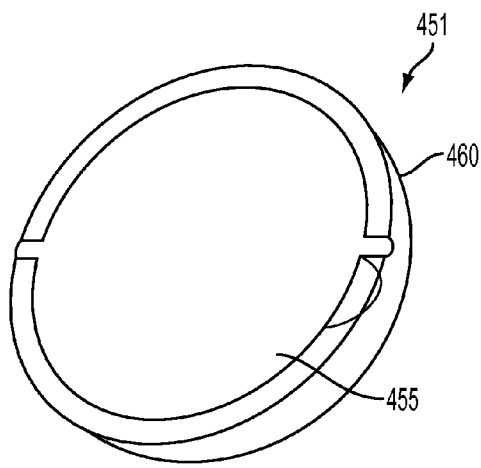
Figure 25D:
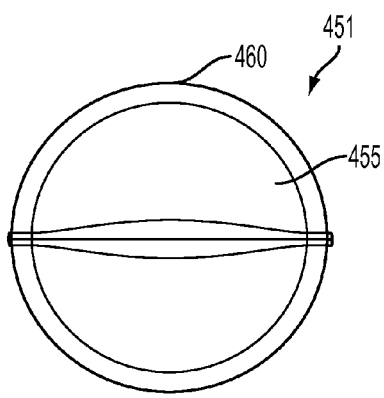

The interior or first plastic material 455 can have a different shape, color and/or flavor from the second plastic material 460 such as heart shaped (FIG. 25A).

FIGS. 26A-D illustrate another pet chew toy having an outer or second plastic material 460 having a dog bone shape with a dog bone shaped interior or first plastic material 455. The first plastic material 5 can have a different color or colors from the second plastic material 10 as well as different flavor or flavors. The materials would be biodegradable materials.

It is understood that various shapes and colors can be used and that the illustrations in FIGS. 25A-D and FIGS. 26A-E are only illustrative and not intended to be limiting as to the invention.

A further embodiment of the invention is shown in FIGS. 27A-E where the pet chew toy 451 is formed by a material such as a food item 475 being inserted or located inside of the molded biodegradable plastic material 470. The food item can be beef jerky or any other suitable item for insertion into the molded plastic material 470.

Alternatively the plastic material 470 can be over molded over the food item 475 in the manner previously described in connection with the first embodiment of the invention and which is incorporated by reference herein thereto. Again the biodegradable plastic material 470 can be made from a starch such as corn starch and contain a binder such as EVA (Booda Velvets) or Casein (TFH Edibles).

In FIGS. 27A-E, the plastic material 475 and the food insert 475 are shaped as dog bones.

It is understood that this is just an illustrative example of the invention and that the invention is not intended to be limited to any shape. For the plastic material 470 and for the food item 475 each of which can have different shapes including from each other. The food item 475 is made in one piece and is located within the center 478 of the plastic material 470 (see FIG. 27E showing half of the pet chew toy 451 of FIG. 27B) and extends throughout the plastic material 470 and to the ends 476, 477 of the plastic material 470 as shown in FIGS. 27A and 27C. Therein, plastic material 470 comprises a first portion 470a, a second portion opposed to the first portion 470b, and a third portion 470c connecting the first and second portions.

As seen in FIGS. 27A and 27C-E, body 470 includes an interior space and a passage to the interior space.

Figure 28A:
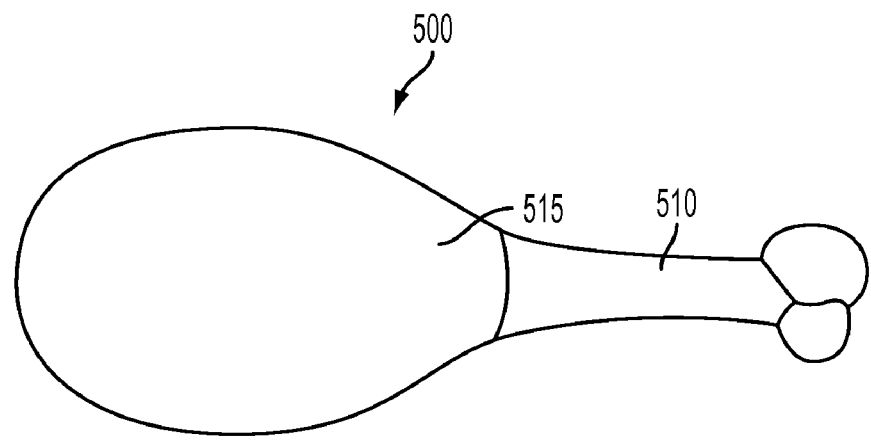
FIG. 28a is a top view of a pet toy and FIG. 28b is a cross-sectional laid-open view of the toy.
Figure 28B:
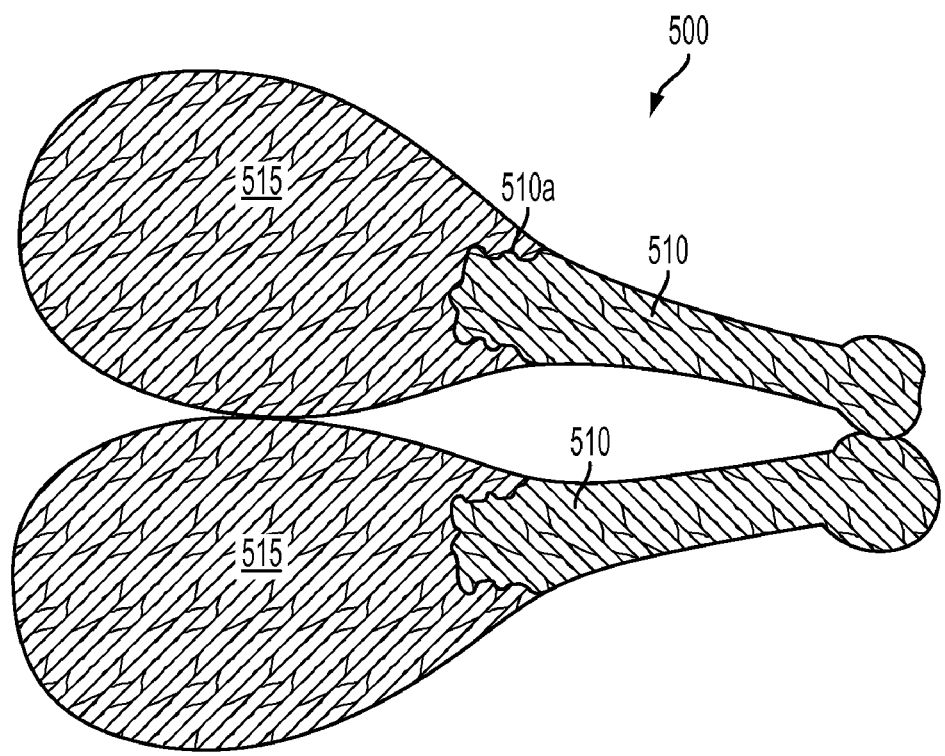

FIGS. 28a-28b illustrate a further embodiment. Therein, FIG. 28a is a top view of a pet toy and FIG. 28b is a cross-sectional laid-open view of the toy. A pet toy 500 comprising biologically degradable materials and includes a plurality of portions, wherein one or more portions are overmolded. The pet toy may have any suitable shape desired.

For example, herein, pet toy 500 includes a first portion 510 that is overmolded by a second portion 515. Pet toy 500 is formed to provide an appearance of a culinary-dressed chicken leg having a "bone" portion and a "meat" portion comprising respectively portions 510 and 515.

Herein, first portion 510 (emphasized by an outline) comprises preferably biologically degradable material 10a having greater elasticity and less hardness than biologically degradable material 10b while second portion 515 comprises biologically degradable material 10b. However, the portion 510 may comprise biologically degradable material 10b while portion 515 may comprise biologically degradable material 10a. One skilled in the art would recognize that both portions may comprise the same biologically degradable material.

Further, the biologically degradable materials of portions 510 and 515 may be colored and/or textured to differentiate each other.

Portion 510 comprises one or more keys 510a that permit an overmolding, such as portion 515, to adhere to portion 510 and to resist separation from it.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A biodegradeable chew toy comprising:
    a first body comprising a first biodegradeable material having a first characteristic;
    a second body comprising a second biodegradeable material having a second characteristic; and
    the second body being substantially entirely overmolded by the first body;
    wherein the first characteristic and the second characteristic differ by one of flavor and color.

2. The biodegradeable chew toy of claim 1, wherein the second body comprises a cross-sectional shape of a plus sign.

3. The biodegradeable chew toy of claim 2, wherein the first body comprises an outer shape of substantially a sphere.

4. The biodegradeable chew toy of claim 1, wherein the first and second biodegradable material comprising a starch and a binder.

5. The biodegradeable chew toy of claim 4, wherein the binder comprises one of ethyl vinyl acetate and casein.

6. The biodegradeable chew toy of claim 1, wherein the first and second biodegradable material differ only by the respective first and second characteristic.

7. The biodegradeable chew toy of claim 1, wherein the first body comprises an outer shape of substantially of a bone.

8. A chew toy comprising:
    a first body comprising a biodegradeable material, the first body comprising a first portion, a second portion opposed to the first portion, and a third portion connecting the first and second portions; the first body comprising an interior space defined by the first, second, and third body portions, the interior space being open to an exterior along three sides of the first body; and
    a second body disposed at least partially in the interior space and extending through the passage to an exterior of the first body;
    wherein the second body comprises a food item.

9. The chew toy of claim 8, wherein the food item is beef jerky.

10. The chew toy of claim 8, wherein the second body comprises a unitary structure.

11. The chew toy of claim 10, wherein the unitary structure is planar.

12. The chew toy of claim 11, wherein the interior space and passage are planar.

13. The chew toy of claim 11, wherein the first body comprises a bone-shape.

14. The chew toy of claim 8, wherein the first body comprises a molded shape.

15. The chew toy of claim 8, wherein the biodegradable material comprises a starch and a binder.

16. The chew toy of claim 15, wherein the binder comprises one of ethyl vinyl acetate and casein.

17. A method of making a chew toy, the method comprising the steps of:
    (a) inserting a food item into a mold;
    (b) molding a biodegradable material as a body around the food item, the body comprising a first portion, a second portion opposed to the first portion, and a third portion connecting the first and second portions; the first body comprising an interior space defined by the first, second, and third body portions, the interior space being open to an exterior along three sides of the body.

18. The method of claim 17, wherein the body comprises a bone-shape.

19. The method of claim 17, wherein the biodegradable material comprises a starch and a binder.

20. The method of claim 19, wherein the binder comprises one of ethyl vinyl acetate and casein.

21. The method of claim 17, wherein the food item comprises a unitary structure.

22. The method of claim 17, wherein the food item is planar.

* * * * *

UNITED STATES PATENT AND TRADEMARK OFFICE
Certificate

Patent No. 8,127,720 B2

Patented: March 6, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jonathan Willinger, Tenafly, NJ (US); and Ryan Rutherford, Rutherford, NJ (US).

Signed and Sealed this Second Day of October 2012.

TIMOTHY D. COLLINS
*Supervisory Patent Examiner*
Art Unit 3644
Technology Center 3600